United States Patent Office 3,835,008
Patented Sept. 10, 1974

---

3,835,008
AUTOMATIC CONTROLLED-CURRENT COULOMETRIC ENVIRONMENTAL MONITOR
Dale J. Fisher and Theodore R. Mueller, Oak Ridge, Tenn., assignors to the United States of America as represented by the United States Atomic Energy Commission
Filed Dec. 6, 1972, Ser. No. 312,540
Int. Cl. G01n 27/42, 27/44
U.S. Cl. 204—195 T
2 Claims

ABSTRACT OF THE DISCLOSURE

An automatic, controlled-current coulometric titrator having several unique features, i.e., (1) an automatic titration mode, and (2) an automatic compensation current mode, enables, the standardization and calibration of methods of analysis used in pollution control and has found recent utility in sample analyses for traces of water.

Background of the Invention

This invention was made in the course of, or under, a contract with the United States Atomic Energy Commission.

Recently, a need has arisen for a method to analyze the cover gas over $NaBF_4$ coolant salt in molten-salt breeder reactors for traces (as little as $1 \mu g$.) of water. In the past, constant-current coulometric methods have been described for the determination of water. One such method was described in an article "Determination of Water by Titration With Coulometrically Generated Karl Fischer Reagent," by A. S. Meyer, Jr. and C. M. Boyd, published in *Analytical Chemistry, 31*, 215 (1959). Another titrator for this constant current method was described in an article entitled "Automatic Coulometric Titrator for the Karl Fischer Determination of Water," by M. T. Kelly, R. W. Stelzner, W. R. Laing, and D. J. Fisher, published in *Analytical Chemistry, 31*, 220 (1959). These methods depend upon the coulometric regeneration of Karl Fischer reagent which occurs when iodine is electrilytically generated in a solution containing depleted reagent. The end point is reached when an excess of iodine is generated and can be detected by the depolarization of platinum indicator electrodes. In coulometric titrations, the number of gram equivalent weights of generated titrant required to reach the end point is calculated from the number of coulombs of current used to generate the titrant.

The calculation of the amount of water titrated coulometrically is based upon Faraday's Laws of electrolysis and upon the assumption of 100% current efficiency. The validity of the latter assumption is regularly checked by standard solutions of water in methanol. To prepare the standards, known amounts of water are added to methanol, and correction is made for a blank on methanol alone. The relationship that 10.71 coulombs of generating current is equivalent to 1 mg. of water is used for water titrations. In the past the useful range of coulometric titration for the determination of water was from 5 seconds at 50 ma. to 100 seconds at 300 ma., corresponding to 0.02 and 3 mg. of water, respectively.

Several major problems have existed in relation to coulometric Karl Fischer titration techniques with prior instrumentation. One problem, for example, is created by the fact that, between samples, depleted Karl Fischer reagent in methanol remains in the anode compartment of the cell. A slight excess of iodine must be maintained corresponding to the end point potential difference across the polarizable electrode pair. Consequently, between sample or standard titrations, an appropriate current must be supplied to compensate for the small iodine demands caused by side reactions, diffusion between cell compartments or from leakage of water from the atmosphere into the cell. It is apparent that the value of any needed compensation current will change slowly with time depending upon such factors as the number of prior titrations, impurities in the sample, and leakage rates. Manual determination is very time consuming and must be done just before every titration. The automatic determination of such values is an existing need which the present invention was conceived to meet.

A second major problem occurs when the reaction or titration is very slow. When a sample containing water is added, the polarizable electrode pair becomes polarized to a higher voltage, depending upon how wet the anode electrolyte becomes, up to one-half volt or more. With a separate titration current source, iodine is generated to perform the Karl Fischer reaction until the end point is reached again. Particularly when small amounts of water are in the sample, large electrolyte volumes are required and yet the stirring must not be so vigorous as to destroy the polarization layer at the indicating electrode pair and thus introduce excessive noise. The result is that several premature end points may be indicated prior to the arrival of the true end point. Thus, there also exists a need to provide not only a titration current which is proportional to the wetness of the electrolyte in the sample container but also to automatically re-establish a titration current whenever a titration is terminated due to a premature end point. The present invention was conceived to also meet this need in a manner to be described hereinbelow.

Summary of the Invention

It is the object of the present invention to provide in a coulometric titrator means for automatically determining and providing any needed compensation current, means for providing a titration current which is proportional to the wetness of the electrolyte in a sample container, and means for automatically re-establishing a titration current whenever a titration is terminated due to a premature end point.

The above object has been accomplished in the present invention by means for providing not only a constant compensation current, when or if such is desired, but also selectively providing a compensation current automatically that is the average value that was required to hold and maintain a dialed-in end point potential between titrations. Also, means are provided to sense the wetness of the electrolyte in the sample compartment of a titrator and provide a titration current that is proportional thereto while at the same time assuring that the cell electrolyte is driven to a true end point in a manner to be described hereinbelow.

DESCRIPTION OF THE PREFERRED EMBODIMENT

Figure 1:
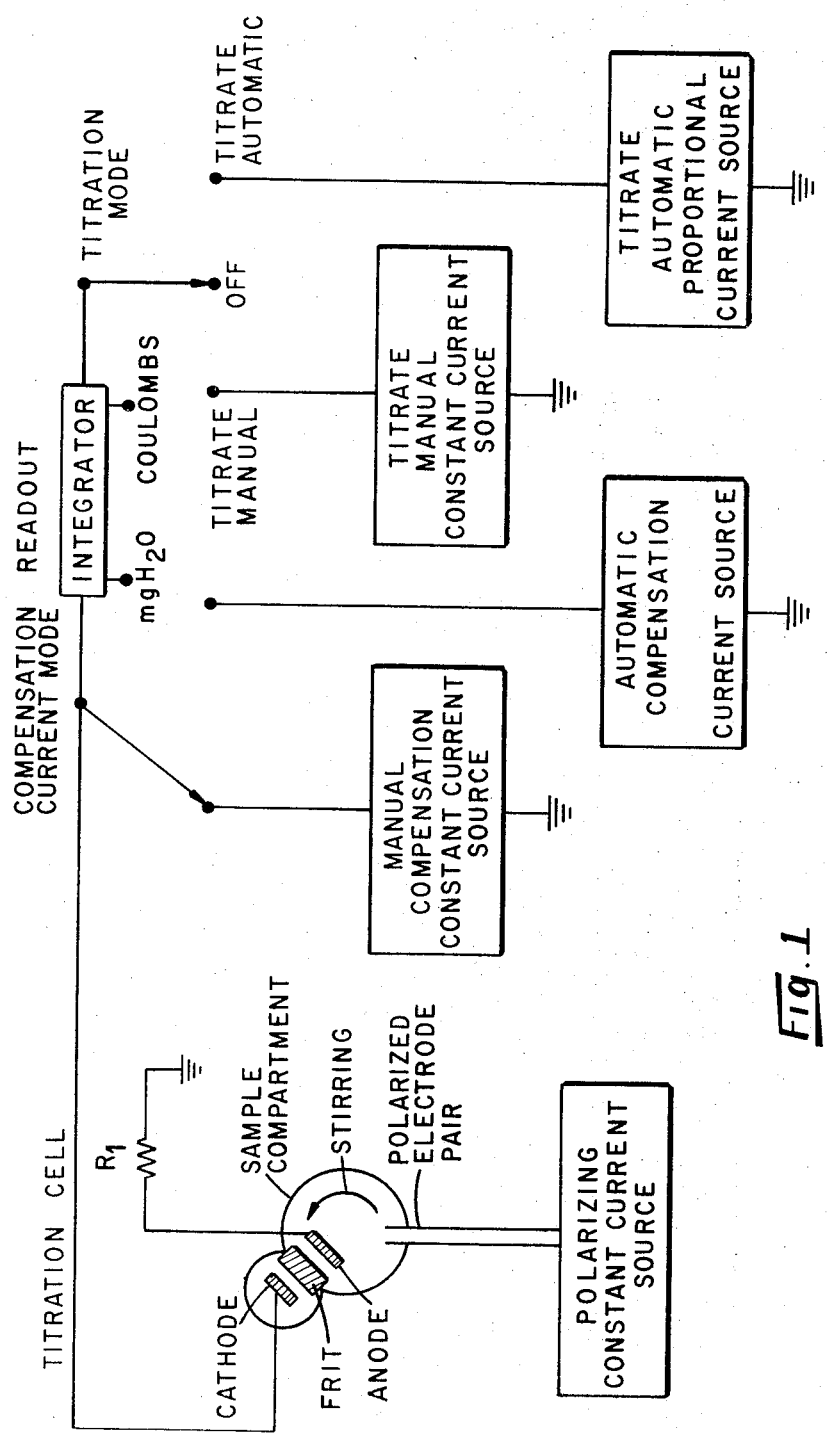
FIG. 1 is a block diagram of the coulometric titrator of the present invention showing its functional options.

FIG. 1 illustrates the functional options of the present invention whereby compensation and titration controls can be operated either manually or automatically in any combination. Before a sample or standard is added to the anode compartment of FIG. 1 and between titrations, iodine-depleted Karl Fischer reagent is in the cell. That trace of iodine that depolarizes the indicating electrode pair to the experimentally chosen end point potential must be maintained coulometrically by a compensating current because of small iodine demands caused by side reactions, diffusion from the cathode compartment of the cell, and leakage of water from the atmosphere. This compensation current is also applied during titrations but only the separately supplied titration current is integrated for readout to achieve the effect of 100% current efficiency. If the compensation current value is correct, the voltage across the indicating polarized electrode pair will remain at the selected end point potential. The correctness of the current value in use is verified by the titration of standard solutions of water in methanol.

Figure 2:
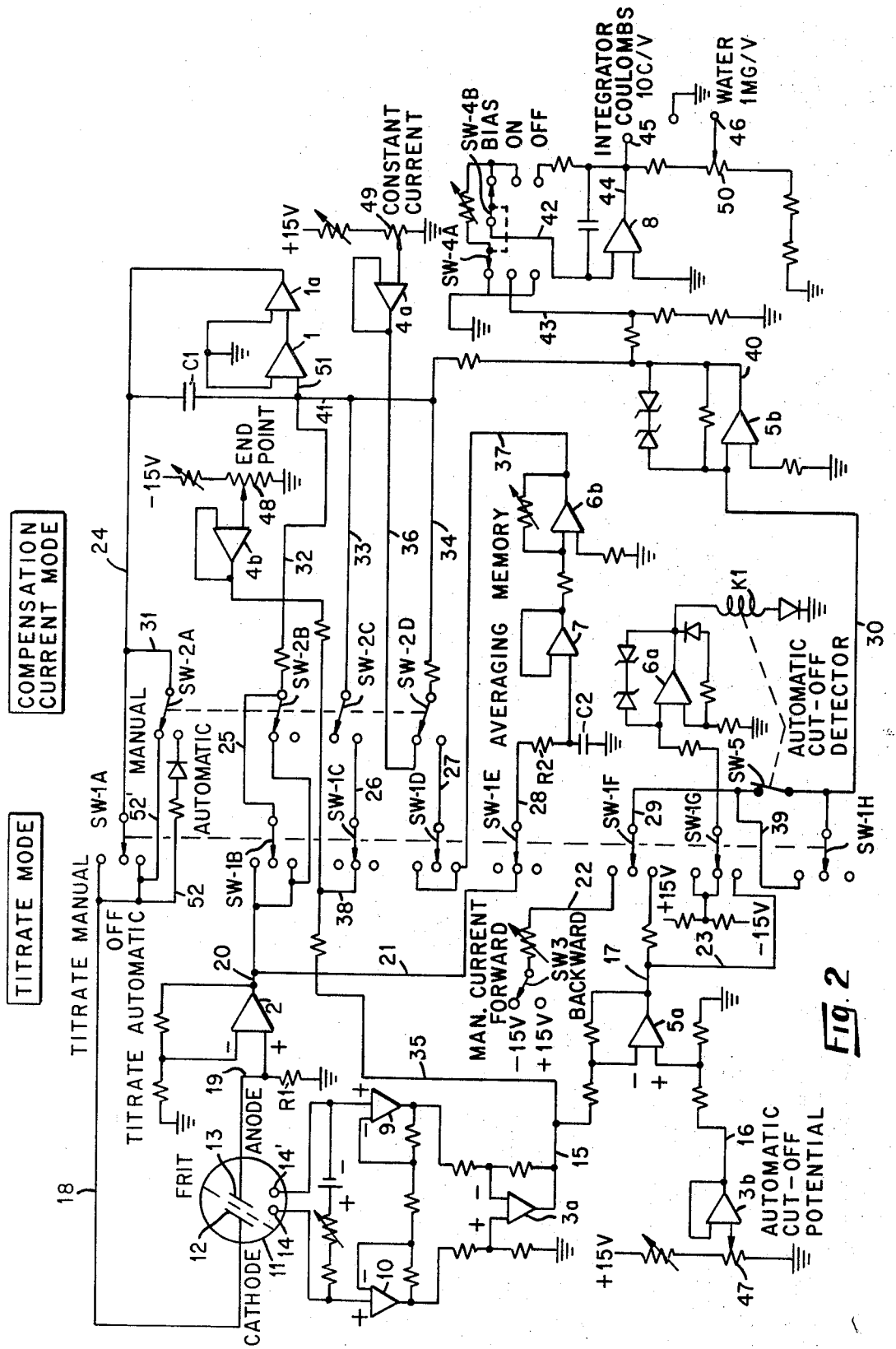
FIG. 2 is a schematic wiring diagram of the system of FIG. 1.

FIG. 2 shows the specific details of the present invention, to which reference is now made. In FIG. 2, a titration cell 11 is provided with an anode 13, a cathode 12, and a polarized electrode pair 14, 14'. The electrode pair 14, 14' are connected to a high impedance input difference amplifier network including amplifiers 9, 10 and 3a. The output of amplifier 3a is connected by means of a line 15 to difference amplifier 5a which also has an input from an automatic cut-off potential amplifier 3b over line 16. The output of the amplifier 3b is a function of the setting of an input potentiometer 47 connected to the amplifier 3b.

The output of the difference amplifier 5a is connected by means of a lead line 17 and a lead line 23 to the lower contacts of switches SW–1F and SW–1G, respectively, which is the titrate automatic position of these switches. When switches SW–1F and SW–1G are positioned in the automatic titrate position, then the output of amplifier 5a is connected by way of lead 17, switch SW–1F, lead 29, relay switch SW–5 of the relay K1, and lead 30 to the amplifier 5b, and also the output of amplifier 5a is connected by way of lead 17, lead 23, and switch SW–1G to the amplifier 6a. The output of amplifier 6a is connected to ground by way of the polarized relay K1. The amplifier 6a, relay K1 and its contact SW–5 serve as a cut-off detector for the automatic titration current control circuit to the amplifier 5b. The output of amplifier 5b is connected by means of a lead 40, a lead 41, and a lead 51 to the amplifier 1 which in turn is coupled to the amplifier 1a. The output of amplifier 1a is connected to the cathode 12 of the titration cell 11 by means of a lead 24, switch SW–1A in either its titrate manual or automatic position, and lead 18. It should be noted that when the switch SW–1A is in its off position, then amplifier 1a is connected by way of lead 24, lead 31, switch SW–2A in either of its positions, lead 53 or 52', and lead 18 to the cathode 12 of the cell 11.

An end point potentiometer 48 is connected to an amplifier 4b, the output of which is connected by way of a pair of resistors and a lead line 35 to a junction point with lead line 15 from the amplifier 3a, such that the difference between the outputs of amplifiers 3a and 4b is potentiostatically caused to be equal when the midpoint of this pair of resistors is connected by line 38 through switch contact SW–1C, line 26, switch contact SW–2C, lines 33, 41, and 51 to the summing point input of amplifier 1.

The anode 13 of the cell 11 is connected by a lead line 19 to a grounded resistor R1 and to an amplifier 2. The output of amplifier 2 is connected by a lead 20 to the upper and lower contacts of the switch SW–1B, and these contacts are also connected to the upper contact (manual position) of the switch SW–2B, such that when the switch SW–1B is in either manual or automatic position, amplifier 2 is connected by line 20, switch SW–1B, line 25, line 32, and line 51 to the amplifier 1; or when the switch SW–1B is in its off position, amplifier 2 is connected by line 20, switch SW–2B in its manual position, line 32 and line 51 to the amplifier 1.

The combined outputs of amplifiers 3a and 4b are also connected by means of a line 38 to the off position contact of switch SW–1C. The switch SW–1C is connected by a line 26 to the automatic position contact of the switch SW–2C which in turn is connected by a line 33, line 41 and line 51 to the amplifier 1. Thus, when switch SW–1C is in the off position and switch SW–2C is in its automatic position, then the combined outputs of amplifiers 3a and 4b are connected by line 38, switch SW–1C, line 26, switch SW–2C, lines 33, 41 and 51 to the amplifier 1.

Between titrations and when the switch SW–1E is in its off position, as shown in the drawing, the output of the amplifier 2 is connected by line 20, line 21, switch SW–1E in its off position and line 28 to the RC circuit comprising a resistor R2 and a capacitor C2. The junction between R2 and C2 is connected to an amplifier 7 whose output is connected to an amplifier 6b. As long as the switches SW–1D and SW–1E are in their middle or off position, the output of amplifier 6b is open circuited and a charge will collect on the capacitor C2 which is proportional to the average value of the compensation current required or supplied during the most recent 200 seconds (4 times the time constant of the RC circuit). Thus, the RC circuit comprising the resistor R2 and the capacitor C2 constitutes an averaging memory circuit. It should be understood that the amplifier 7, as well as all of the other amplifiers shown in FIG 2, is connected to a suitable power and biasing supply, not shown, in a conventional manner.

The compensation current mode switches SW–2A to SW–2D are ganged together and they can be switched from a manual position, shown in the drawing, to an automatic position. In the manual position, a selected constant compensation current is supplied to the cell 11 from an adjustable potentiometer 49 by way of an amplifier 4a, a line 36, switch SW–2D in its manual position, a line 34, and lines 41 and 51 to the series connected amplifiers 1 and 1a, whose output is connected to the titration cell 11 in a manner previously described. In the automatic position of the compensation current mode switches, the selected end point potential set on the potentiometer 48 is connected by means of the amplifier 4b, line 38, switch SW–1C in its off position between titrations, line 26, switch SW–2C in its automatic position, lines 33, 41 and 51 to the amplifier 1 then to the cell 11 in a manner previously described. Thus, a compensation current is supplied to the cell 11 between titrations, when the titration mode switches are in their off position, either from the potentiometer 49 or from the potentiometer 48, depending upon the position of the switches SW–2C and SW–2D. However, when the next titration operation is started, either manual or automatic, and the automatic compensation current mode is selected, then the above-described memory circuit will be switched into the feedback circuit by means of the switch SW–1D, and the switch SW–1C will then open the circuit to the potentiometer 48. Thus, the output of amplifier 6b is then connected by a line 37, switch SW–1D, a line 27, switch SW–2D, and lines 34, 41 and 51 to the amplifier 1 to automatically supply a compensation current as a function of the charge stored on the capacitor C2 which acts as a constant bias to the amplifier 7. Thus, it should be evident that the amount of charge held on the capacitor C2 at the beginning of the next titration operation is a function of the time constant of the RC circuit which in the present case has been chosen to be 50 seconds, and the memory circuit, previously described, will determine the average value of compensation current supplied between titrations during the most recent 200 seconds, such that this value of compensation current will be provided during said next titration if the automatic compensation mode is selected. The automatic compensation current mode and the averaging memory circuit very successfully circumvent the substantial problems caused by the variability with time of the needed compensation.

The titration mode switches SW–1A to SW–1H are ganged together and they can be positioned together to an off position, to a titrate manual position, or to a titrate automatic position. In the titrate manual position of these switches, the switch SW–1H shunts out the relay K1 switching contact SW–5 by a line 39, and the switch SW–1F is connected by a line 22 and a variable resistor to a switch SW–3 which is selectively positioned to switch in a −15 volt source or a +15 volt source, such that the constant titration current (forward or backward; 10 to 200 mA in six steps) selected by the user is supplied by the variable resistor over the line 22, switch SW–1F, line 29, line 39, switch SW–1H, line 30, amplifier 5b, and lines 40, 41 and 51 to the amplifier 1 which is connected to the titration cell 11 in a manner previously described by means of amplifier 1a, line 24, switch SW–1A, and line 18.

In the titrate automatic position of the titration mode switches, an operator dials in the selected value of the automatic cut-off potential in mV by means of the potentiometer 47. After the titration mode switches are turned to titrate automatic, the titration proceeds. The titration current is directly proportional to the difference between the voltage developed across the indicating electrode pair 14, 14' and the selected cut-off potential. In this mode, the cut-off potential can be set at the end point potential. The titration current is proportional to the wetness of the electrolyte in the cell 11 and the latter part of the titration is done increasingly slowly. When the automatic titration is completed, a red pilot light, not shown, at the titrate automatic position of the titration mode switch goes out. This pilot light is controlled by another relay, not shown, connected in the output of the amplifier 6a. The titration is terminated by the automatic cut-off detector having unilateral hysteresis. As mentioned previously this cut-off detector includes the amplifier 6a, relay K1 and its relay contact SW–5 which contact opens the circuit between the amplifier 5a and the amplifier 5b when the titration is completed. However, if the voltage across the indicating electrode pair 14, 14' drifts 8 mV above the automatic cut-off potential because of a premature end point, a small titration current will thus be automatically applied by a closing of the relay contact SW–5 to drive the cell electrolyte to a true end point.

A read-out circuit which includes an integrator is provided for providing indications of the amount of titration current supplied in coulombs and the amount of water titrated by the above system for a given titration operation. In this read-out circuit, the output of the amplifier 5b is connected by means of the line 40, a resistor and a line 43 to the on position of a pair of switches SW–4A and SW–4B which are ganged together. The switches SW–4A and SW–4B have a bias position and an off position in addition to their on position. In the on position of these switches, the line 43 is connected by means of a variable resistor through these switches to a line 42 leading to an amplifier 8. The output of amplifier 8 is connected by means of a line 44 to a first output terminal 45 and by means of the line 44 and a potentiometer 50 to a second output terminal 46. The output terminals 45 and 46 are each adapted to be connected to a digital voltmeter for providing readouts that are whole-number-proportional to coulombs and to mg of water titrated.

It should be understood that an analog d'Arsonval movement meter, not shown, is provided in the above-described system. This meter is utilized to read either cell current, or polarized electrode voltage, or volts from the cut-off potential.

It should be further understood that FIG. 2 is drawn for the case where the function switch of the titrator, not shown, is in the operate position. Not shown are the other positions of the function switch: Open cell where no current can flow in the cell and test 1 and test 2 positions wherein modes are provided for internal electrical checkout and for verification of correct internal electrical operation of the titrator.

In the above-described system, two electrically and chemically independent current sources are required but both electrode pairs must be immersed in electrolytically connected chambers. The problem of preventing the value of generating current in use from affecting through common paths and pickup the potential developed across the indicating electrode pair 14, 14' has been entirely solved with the isolation provided by the high input impedance difference amplifier network constituting the amplifiers $3\alpha$, 9 and 10. The use of this amplifier network has the additional advantage that it avoids artifacts due to loads constituting current drains on the polarized electrode pair.

In tests with the above system, the titrator servo circuits proved very stable with electrochemical loads. There was no interaction of the compensating and titration current circuits. An end point was obtained with the automatic compensation current mode and the titrate automatic titration mode that held constant within the equivalent of 1 $\mu$g. of water during 15 minutes past the completion of the titration. With the titrator of the present invention it is anticipated that water can be determined with less attention from the user and with better precision and accuracy than was possible with instrumentation in use in the past. The full scale range of the above-described titrator is from 6 to 0.1 mg. of water per titration with a sensitivity of 0.5 $\mu$g. A substantial number of titrations can be performed with a given cell filling. It is, however, emphasized that the present coulometric Karl Fischer titration of water is only an immediate application of the present invention. It can be used in any analysis or application which requires measurement by coulometry. It should be understood that the high input impedance difference amplifier network (amplifiers $3a$, 9 and 10) as utilized in the above-described system is also useful for other titration monitoring electrode pairs — e.g., redox electrode pair, glass electrodes, ion-selective electrode with reference electrode, etc., or for photometric detection. Moreover, the network intervenes to control cell current in response to a command or programmed voltage epoch; this command can be modified or externally derived for diverse applications of this invention.

This invention has been described by way of illustration rather than limitation and it should be apparent that it is equally applicable in fields other than those described such as environmental analyses and pollutant monitoring.

What is claimed is:

1. In a controlled-current coulometric titrator system for detecting traces of water in a sample, comprising a titration cell having an anode in an anode compartment and a cathode in a cathode compartment, said cell enclosing an iodine- depleted reagent in the anode compartment thereof and said cell adapted to receive said sample, a pair of polarized detector electrodes mounted within the anode compartment of said cell, a constant compensation current source connected to said cell, a titrate automatic proportional current source connected to said cell, said titrate current source supplying a current to said cell proportional to the wetness of the electrolyte therein as detected by said polarized electrode pair, a readout integrator circuit coupled between said titrate current source and said cell to provide indications proportional to coulombs of titrant current and to mg. of water titrated, and a cut-off detector coupled to said electrode pair for terminating the titration of said cell when a desired cut-off potential is reached, the improvement wherein said system further comprises an energized end point potentiometer for providing a desired reference end point potential, an averaging memory circuit comprising an RC circuit including a resistor and a capacitor, a first switching means for disconnecting said titrate current source from said cell at the end of a titration period which at the same time connecting said anode to said averaging memory circuit to store on said capacitor a charge proportional to the average value of compensating current that will hold and maintain said desired end point potential between titrations, and a second switching means for selectively connecting either said constant compensation current source or the output of said averaging memory circuit to said cell when said first switching means is repositioned at the beginning of the next titration, said averaging memory circuit automatically providing to said cell a compensation current equal in magnitude to the average value of the compensation current supplied during a selected time interval just preceding said next titration.

2. The system set forth in claim 1, wherein said system further includes a source of selected constant titration current of a selected polarity, said first switching means including means for connecting said selected constant titration current source to said cell while at the same time permitting said averaging memory circuit to be connected to said cell when selected by said second switching means.

References Cited

UNITED STATES PATENTS

| 3,131,133 | 4/1964 | Barendrecht | 204—1 T |
| 3,726,778 | 4/1973 | Levy et al. | 204—195 T |

OTHER REFERENCES

Meyer et al, "Anal. Chem.", vol. 31, 1959, pp. 215–219.

Kelley et al., "Anal. Chem.," vol. 31, 1959, pp. 220–221.

TA-HSUNG TUNG, Primary Examiner

U.S. Cl. X.R.

204—1 T; 23—232 E, 254 E.